(12) United States Patent
Weber

(10) Patent No.: US 6,439,717 B2
(45) Date of Patent: Aug. 27, 2002

(54) SPECTACLES

(76) Inventor: Rainer Weber, Sanddornweg 10, 53773 Hennef (DE)

( * ) Notice: Subject to any disclaimer, the term of this patent is extended or adjusted under 35 U.S.C. 154(b) by 0 days.

(21) Appl. No.: 09/726,630

(22) Filed: Nov. 30, 2000

(30) Foreign Application Priority Data

Dec. 2, 1999 (DE) .......................................... 199 58 005

(51) Int. Cl.[7] .................................................. G02C 1/02
(52) U.S. Cl. ........................ 351/110; 351/146; 351/149
(58) Field of Search ................................. 351/110, 143, 351/146, 149, 151, 154

(56) References Cited

U.S. PATENT DOCUMENTS

| | | | |
|---|---|---|---|
| 5,997,137 A | 12/1999 | MacIntosh, Jr. | 351/41 |
| 6,007,200 A | * 12/1999 | Tachibana | 351/110 |
| 6,024,445 A | * 2/2000 | Conner et al. | 351/110 |

FOREIGN PATENT DOCUMENTS

| | | |
|---|---|---|
| DE | 3239699 A1 | 5/1984 |
| EP | 0724178 A1 | 7/1996 |
| EP | 0805369 A1 | 11/1997 |
| WO | WO 96/30799 A1 | 10/1996 |
| WO | WO 98/40778 | 9/1998 |
| WO | WO 98/45748 A1 | 10/1998 |
| WO | WO 00/26716 | 5/2000 |

* cited by examiner

*Primary Examiner*—Huy Mai
(74) *Attorney, Agent, or Firm*—Harness, Dickey & Pierce, P.L.C.

(57) ABSTRACT

A pair of spectacles has lenses (1, 2) that are connected to one another by a bridge element (3). The sides (6) are connected to the lenses (1, 2) by holding elements (5). The holding elements (5) and the bridge element (3) are preferably produced from flexible wire. The bridge element (3) and the holding elements (5) are connected to the two lenses (1, 2) by corresponding angled portions. A holding portion and a pin portion connect with the lenses (1, 2). The pin portion is accommodated in a through-bore of the lenses (1, 2). The holding portion is accommodated in a respective slot of the lens. Variations are possible by providing a simple plug-in connection allowing a selection to be made from a modular system, which enables the purchaser to assemble his/her own individual pair of spectacles.

20 Claims, 4 Drawing Sheets

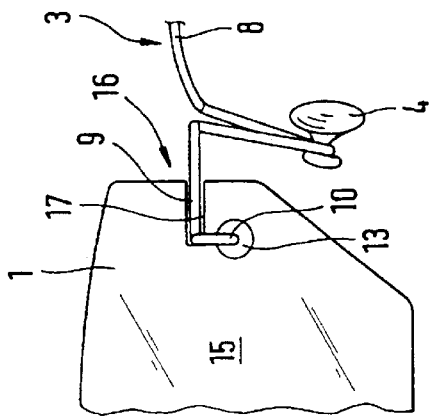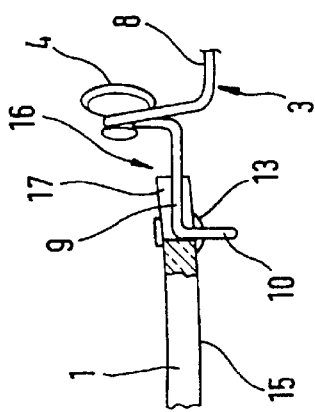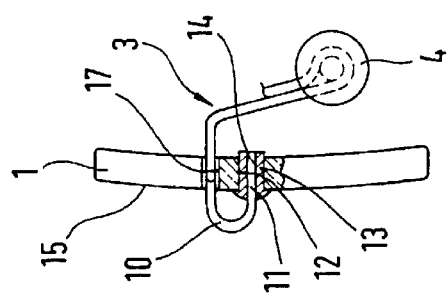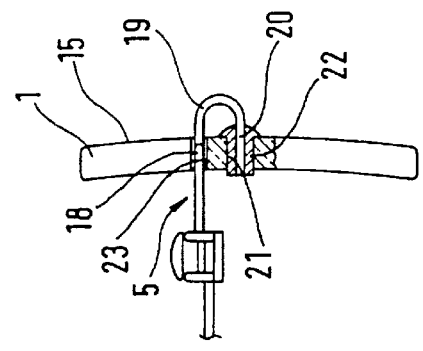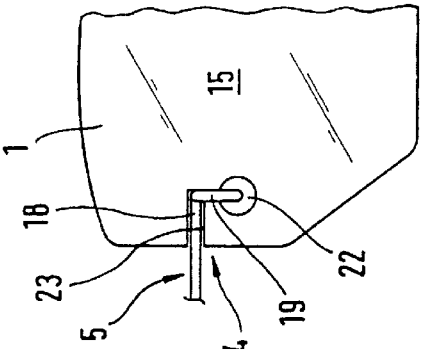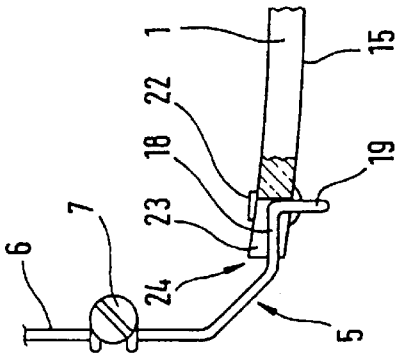

SPECTACLES

CROSS-REFERENCE TO RELATED APPLICATION

This application is based upon and claims priority to German Patent Application 199 58 005.7 filed Dec. 2, 1999, which application is herein expressly incorporated by reference.

BACKGROUND OF THE INVENTION

The invention relates to a pair of spectacles with two lenses, a bridge element connecting the lenses, a holding element, per lens, a side part connected to the holding element or additional rim mounting elements partially or fully enclosing the rim mounting elements.

Prior art spectacle mountings exist where the holding elements carrying the sides and the bridge element between the two lenses form a non-removable part of the rim mounting for the lenses. Also, partial rim mountings are known which are secured to the lenses by glue. Further, prior art connections exist where each lens has a through-bore with a pin of the bridge element and a pin of the holding element guided through the through-bore of the lens and glued thereto. Such an embodiment of a mounting for spectacles provides little flexibility with regard to the design of the spectacles. Spectacles without rim mountings for the lenses suffer from stability problems with respect to the connections.

WO 96/30799 A1 describes a mounting for spectacles where the two sides and the bridge are connected to the lenses by a flexible, U-shaped bent wire securing element. One leg of the U-shaped fixing element passes through a bore near the rim of the associated lens. The second leg, which extends parallel to the first leg, due to an elastic pre-tension between the legs, is pressed against the outer contour and into an indentation in the outer contour of the lens. As a result, the lens is clamped into the mounting.

WO 98/45748 A1 shows a mounting for spectacles where the two sides are secured to the bridge relative to each lens by wire portions. The wire portions each comprise a pin portion entering a bore near the rim of the lens, and a U-shaped arch connected via an arch to the pin portion. The first leg of the U-shaped arch is positioned in the same plane as the pin portion. The second leg, together with the first leg, forms a plane which is positioned perpendicularly relative to the second plane formed between the pin portion and the first leg. The legs of the U-shaped arch are positioned at the outer rim of the lens.

DE 32 39 699 A1 discloses holding clips which are U-shaped and partially embrace the lens on both sides. The holding clips have two parts which, outside the lens, are tensioned relative to one another by screws and clamp the lens between them.

SUMMARY OF THE INVENTION

It is an object of the present invention to provide spectacles which meet the purchaser's expectations and can be assembled from a modular system of components. The components include holding elements, sides and bridge elements as well as a full mounting or partial mounting. The modular system enables the parts to be connected in a simple way. In addition, the system enables a connection between the bridge element and the lenses or the associated rim mounting elements and between the holding element and the lenses or the associated rim mounting elements. Thus, the system achieves advantageous stable conditions and an easy assembly. Furthermore, the system provides a connection which, when subjected to external forces, is flexible so that damage is largely avoided.

The spectacles comprise two lenses connected by a bridge element. A holding element is present, per lens, and a side is connected to the holding element. The bridge element has two first pin portions and for each first pin portion a first holding portion. Each holding element includes a second pin portion and a second holding portion. The lenses or rim mounting element, for the bridge element connected to the lenses, include a first through-bore to receive one first pin portion. The lenses have a first slot which starts from or a rim region of the lens at the nose end or of the rim mounting element. The slot is arranged so as to correspond to the associated first holding portion. The slot serves to accommodate the first holding portion. The lenses and/or rim mounting elements further include, at the side part end, a second through bore to receive a second pin portion. A second slot starts from the rim region of the lens at the side end, or of the rim mounting element. The second slot is arranged so as to correspond to the second holding portion. The second slot serves to accommodate the second holding portion.

In a second embodiment, the spectacles comprise two lenses connected by a bridge element. A holding element is present, per lens, and a side connects to the holding element. The bridge element includes two first pin portions and a first holding portion for each first pin portion. Each first pin portion is arranged so as to intersect, at a distance, the associated first holding portion or an imaginary extension of the associated first holding portion.

Each holding element includes a second pin portion and a second holding portion. The second pin portion is arranged so as to intersect, at a distance, the second holding portion or an imaginary extension of the second holding portion. Each lens, at the nose end, includes a first through-bore to receive a first pin portion. Also, a first slot on each lens starts from the rim region of the lens at the nose end. The first slot is arranged so as to correspond to the associated first holding portion. The first slot serves to accommodate the first holding portion. The lens, at the side end, has a second through-bore to receive a second pin portion. A second slot starts from the rim region of the lens at the side end. The second slot is arranged so as to correspond to the second holding portion. The second slot serves to accommodate the second holding portion.

In a third embodiment, the spectacles comprise a partially or fully enclosing first and second rim mounting elements for the lenses. A bridge element connects the first rim mounting elements. A holding element and a side connected to the holding element are present for each second rim mounting element. The bridge element includes two first pin portions and for each first pin portion a first holding portion. Each first pin portion is arranged so as to intersect, at a distance, the associated first holding portion or an imaginary extension of the associated first holding portion. Each holding element includes a second pin portion and a second holding portion. The second pin portion is arranged so as to intersect, at a distance, the second holding portion or an imaginary extension of the second holding portion. Each first rim mounting element, at the nose end, includes a first through-bore to receive a first pin portion. A slot starts from the rim region of the first rim mounting element at the nose end. The first slot is arranged so as to correspond to the associated first holding portion. The first slot serves to accommodate the first holding portion. Each second rim mounting element, at the side end, includes a second through-bore to receive a second pin portion. A second slot starts from the rim region of the second rim mounting element at the side end. The second slot is provided to receive a second pin portion. The second slot starts from the rim region of the second rim mounting element at the side end. The second slot is arranged so as to correspond to the second holding portion. The second slot serves to accommodate the second holding portion.

An advantage of the above design variants is that it is easy to provide a connection between the bridge element and the lenses or full or partial rim mounting and between the holding element and the lenses or full or partial rim mounting. Thus, fashion elements can also be used or that individual design elements can be selected from a modular system. When spectacles are provided without a rim mounting for the lenses, an extremely light pair of spectacles is obtained which is pleasant to wear. In addition, because the holding portion engages a slot when subjected to vertical loads, the connections are extremely robust and extremely flexible when loaded in a vertical plane to the vertical loads.

For all embodiments in accordance with the invention, the holding element is produced from a piece of wire. The second pin portion and the second holding portion are formed by correspondingly bent portions of the wire. This results in a simple and easy design. This also applies to the bridge element. Here, a bent piece of wire, with the two first pin portions and first holding portions may be formed by correspondingly bent portions of the wire. Apart from the easy connection with the lens or a rim mounting element, a simple connection is achieved between the holding element and the side by a side joint. When the holding element is produced from wire, the holding element can be bent accordingly so as to form an eye of the side joint. However, the side and the holding element can also be produced in one piece. It is also possible to provide the holding element as a formed part, by pressure die casting or plastic injection molding. The second pin portion and a holding portion are in the form of a formed on web.

In a preferred embodiment, the connection is provided by each first slot and/or second slot extend/extending in such a way that an imaginary extension of the respective slot beyond the associated lens or the associated rim mounting elements towards the other lens or towards its rim mounting elements intersects or crosses the slots. In a preferred embodiment, all first and second slots are arranged so as to extend parallel relative to one another.

A particularly advantageous connection between the through-bore and a pin portion is achieved by a sleeve arranged therebetween. In particular, this is advantageous if the lenses do not have a rim mounting. However, it is also possible for the first and/or the second pin portion to be secured in the associated first and/or second through-bore by an adhesive. If a sleeve is provided, the sleeve can be secured in the associated bore by either a press fit or an adhesive. The first and/or the second pin portion can be secured in the associated sleeve by an adhesive. In addition, the pin portion can be provided with a formed-on thickening, for instance, which engages behind the sleeve after the pin portion has been guided through the bore. However, it is also possible to provide the pin portion with additional surface formations which intensify the force-locking effect.

Preferably, the wire is round wire, although other wire cross-sections are also possible. It is particularly advantageous to use a highly flexible material such as titanium or a titanium-containing material. To increase the number of design variants, the wire can be at least partially coated or enveloped or provided with different paint applications.

When using wire, a visually attractive embodiment is achieved if the first pin portion and/or the second pin portion are/is introduced from the front face of the lens or rim mounting element into the associated first and/or second through-bore. The portion between the holding portion and the pin portion is visible. The appearance of the complete embodiment is appealing. It is also possible for the pin portion to be introduced from the rear face of the lens or the rim mounting element.

From the following detailed description, taken in conjunction with the drawings and subjoined claims, other objects and advantages of the present invention will become apparent to those skilled in the art.

BRIEF DESCRIPTION OF THE DRAWINGS

Three preferred embodiments of the invention are diagrammatically illustrated in the drawing wherein:

FIGS. 2a–2c show different partial section views of the connection (at the nose end) between the lens associated with the right eye and the bridge element.

FIGS. 3a–3c show different partial section views of a connection, at the side end, for the lens for the right eye.

DETAILED DESCRIPTION OF THE PREFERRED EMBODIMENT

Figure 1:
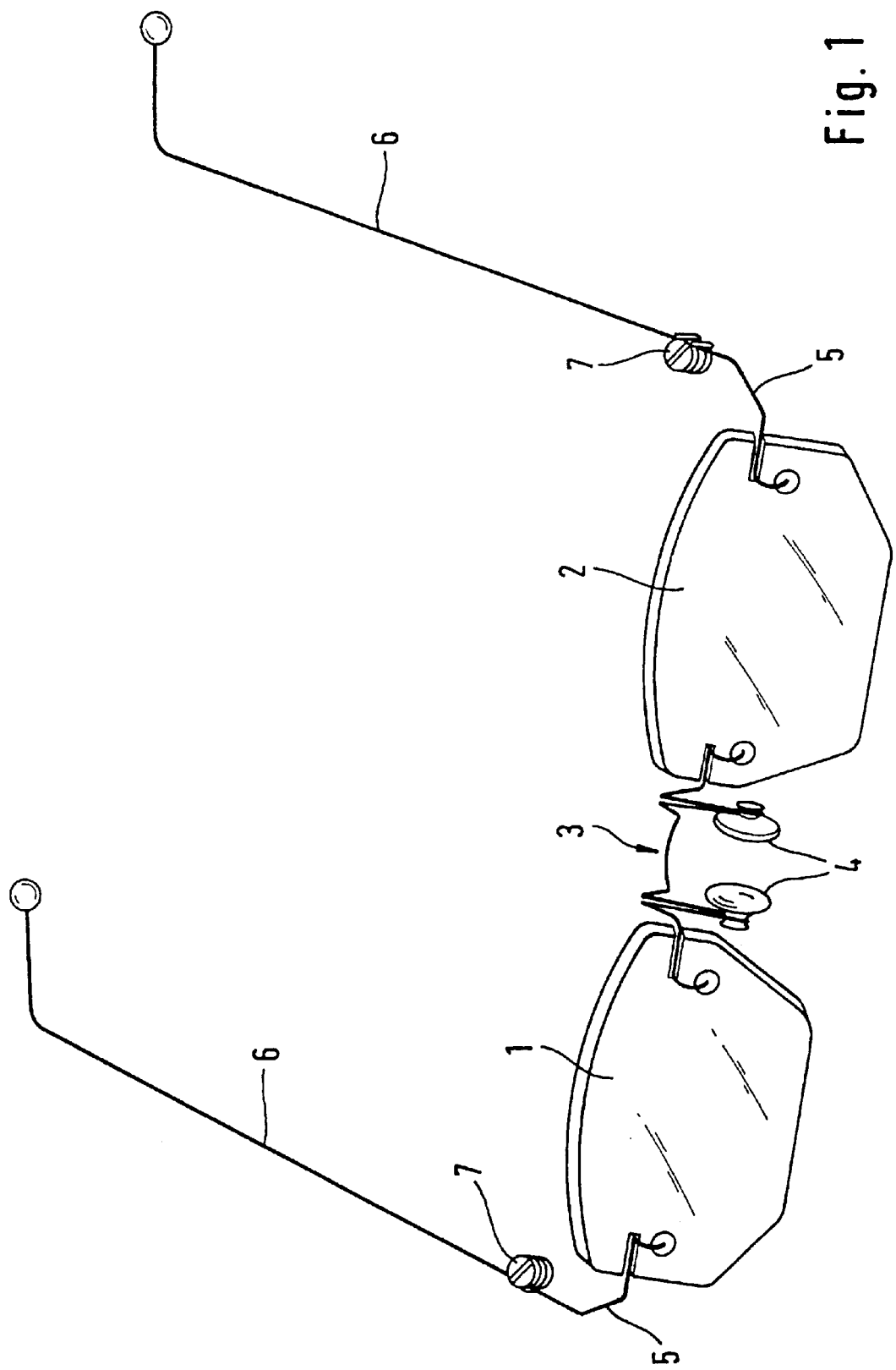
FIG. 1 is a perspective view of a pair of spectacles with the bridge element and the holding elements produced from wire and directly mounted to the lenses.

FIG. 1, in a perspective view, shows a first embodiment of the spectacles in accordance with the invention. The spectacles include two lenses 1 and 2, with lens 1 being the lens associated with the right eye. The two lenses 1, 2 are directly connected to one another by a bridge element 3. Furthermore, holding elements 5 are directly connected to the two lenses 1, 2, with a side 6 being foldably connected to each holding element 5 by a side joint 7.

The connection between the bridge element 3 and the lens 1 is used by way of example for the connection with the lens 2 as well and will be explained in greater detail with reference to FIGS. 2a–2c.

The bridge element 3 includes a bridge portion 8 followed by a wire portion which is first directed downwardly and then upwardly. A nose contact element 4 is secured in the turning region. Thereafter, the wire, approximately at the level of the bridge portion 8, is again angled and forms the first holding portion 9. The wire is then angled at approximately 90° and from there extends at an angle together with the arched portion 10 which changes into the first pin portion 11. The first pin portion 11 also extends approximately at a right angle relative to the holding portion 9. Thus, the first pin portion 11 crosses, at a distance, the first holding portion 9 at a right angle.

In the rim region 16 at the nose end of the first lens 1 a first through-bore 12 is provided. The first through-bore 12 extends through the thickness of the first lens 1. A first sleeve 13 is inserted into the first through-bore 12. The sleeve 13 is glued to the first lens 1, for example. In addition, the first sleeve 13 may include a lentil-shaped thickening positioned on the front face 15 of the first lens 1. The bridge element 3, together with the first pin portion 11 associated with the first lens 1, is inserted into the sleeve bore 14 and secured therein by an adhesive.

A slot 17 is worked into the first lens 1. The slot 17 starts from the rim region 16 at the nose end and is slightly greater than the diameter of the wire forming the bridge element. The bridge element 3 is not secured in the first slot 17 by its first holding portion 9. Thus, the connection in this region is flexible. Accordingly, if the first lens 1 is subjected to a load on its front face 15, a free movement between the first holding portion 9 and the first lens 1 may take place in the region of the first slot 17.

The first holding element 9 accommodates any loads which act vertically on the narrow end of the first lens 1. Thus, the first holding portion 9 of the bridge element 3 actively helps to carry the first lens 1. The edges of the slot 17 of the first lens 1 support themselves on the first holding portion 9. The connection between the bridge element 3 and the second lens 2 corresponds to the connection described above with first reference to the first lens 1. Furthermore, it can be seen that the first slot 17 is arranged at a distance from the first through-bore 12. The first slot 17 is arranged substantially horizontally so that its imaginary extension would intersect or cross the second lens 2.

FIGS. 3a–3c show the connection between the holding element 5 and the side 6. The holding elements connect the side 6 to the first lens 1. This connection corresponds to the connection described above with reference to the bridge element 3.

The holding element 5, which connects the side 6, is connected by a side joint 7. Starting from the side joint 7, the holding elements are angled twice in one plane and end in the form of the second holding portion 18. The wire holding element 5, starting from the second holding portion 18 extends at a right angle while remaining in the same plane. The second pin portion 20 is connected to the holding portion 18 by a second arched portion 19. The second pin portion 20 extends relative to the second holding portion 18. Thus, at a distance, the second pin portion 20 intersects the holding portion 18 at a right angle.

The first lens 1 is provided with a second through-bore 21 in the region of the rim region 24 at the side part end. The second through-bore extends through the thickness of the lens 1. A second slot 23 extends parallel to the first slot 17. A second sleeve 22, corresponding to the first sleeve 13, is inserted into the second through-bore 21. The second sleeve 22 is glued to the first lens 1 in the region of the second through-bore 21. The second sleeve 22 includes a sleeve bore which is engaged by the holding element 5 by the second pin portion 20. The second pin portion 20 is connected to the second sleeve 22 by an adhesive or a friction-locking v or form-fitting connection.

The slot 23 is arranged at a distance from the second through-bore 21. The slot 23 accommodates the holding element 5 with a small amount of play relative to its edges. Thus, the second holding portion 18 also actively carries the lens 1; however, it carries the lens around an axis which extends parallel relative to the axis of the side joint 7. The second holding portion 18 enables a flexible setting or deformation of the holding element 5. The second holding portion 18 is also produced from a thin flexible piece of wire. The second associated side is connected to the associated second lens by a further correspondingly designed holding element in a corresponding way.

Figure 4:
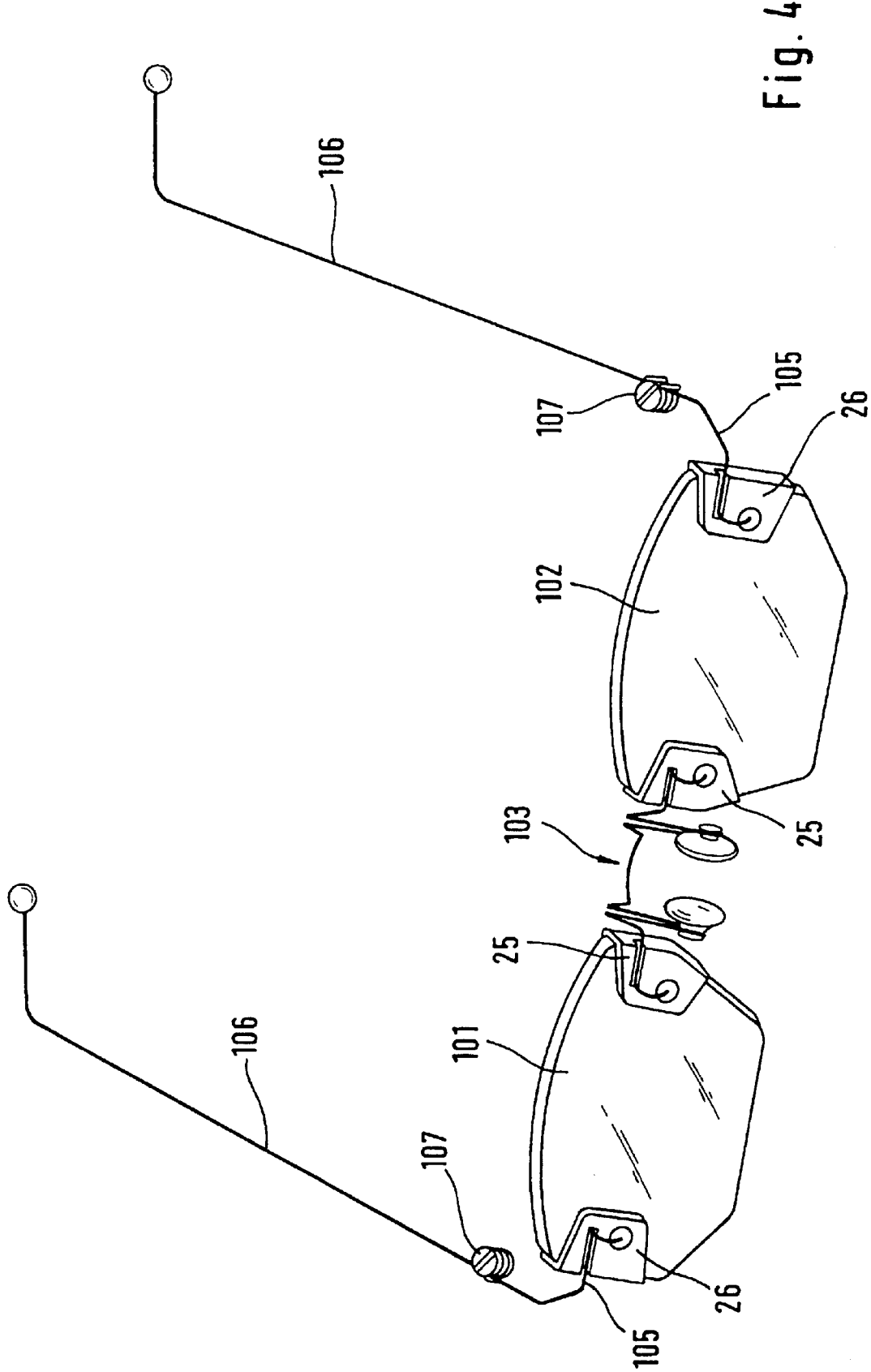
FIG. 4 is a perspective view of an embodiment which is provided with a partial rim mounting in the form of rim mounting elements at the side end and at the nose end.

FIG. 4 shows a pair of spectacles where, as a modification of FIG. 1, the bridge element 103 and the two holding elements 105, in a mirrored representation, are connected to the associated lenses 101, 102 by first and second round mounting elements 25, 26. The through-bores which were described in connection with FIGS. 2 and 3 and are provided for securing the bridge element and the holding element and the associated slots are associated with the rim mounting elements 25 and 26. The through-bores are not directly associated with the lenses 101 and 102 in FIG. 4. The rim mounting elements 25, 26 shown in FIG. 4 may also be connected to one another. Accordingly, the respective lens 101, 102 may be embraced fully or at least partially at its upper or lower rim.

Figure 5:
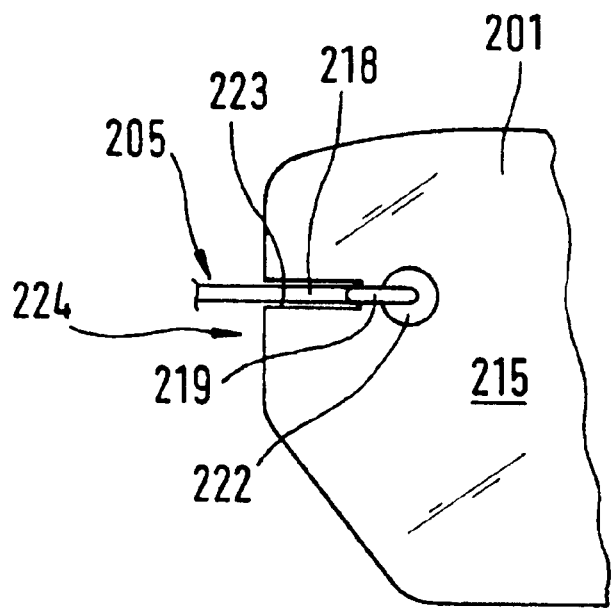
FIG. 5 is a partial elevation view of a further connection at the side end for a lens for the right eye.
Figure 6:
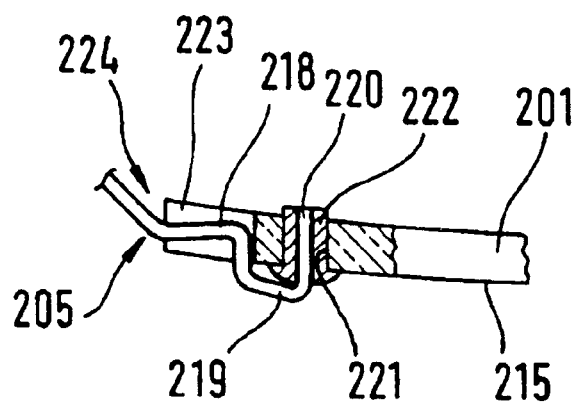
FIG. 6 is a partial section view of the connection at the side end according to FIG. 5.

FIGS. 5 and 6 show a further embodiment of a connection at the side end. Any components corresponding to those of FIG. 3 and having been described in connection with FIG. 3 have been given reference numbers which are increased by the figure 200. The connection according to FIGS. 5 and 6 differs from that shown in FIG. 3 in that the imaginary extension of the second holding portion 218 intersects the second pin portion 220.

While the above detailed description describes the preferred embodiment of the present invention, the invention is susceptible to modification, variation and alteration without deviating from the scope and fair meaning of the subjoined claims.

What is claimed is:

1. Spectacles comprising:
   two lenses;
   a bridge element connecting the two lenses;
   a holding element per lens and a side connected to the holding element;
   the bridge element includes two first pin portions and for each first pin portion a first holding portion;
   each holding element includes a second pin portion and a second holding portion, the lenses or rim mounting elements provided for the bridge element and connected to the lenses include a first through-bore for receiving one of said first pin portions, a first slot is formed in said lenses or said rim mounting elements, said first slot starting from a rim region of the lens at the nose end or in the rim mounting element, said first slot being arranged to correspond to the associated first holding portion and serves to accommodate said first holding portion, said first slot having a width larger than a thickness of said first holding portion such a connection between said first holding portion and said first slot is flexible enabling free movement between said first pin portion and said lenses when said lenses are subjected to a load on a front face of said lenses, said lenses or second rim mounting elements further including, at a side part end, a second through-bore for receiving a second pin portion, a second slot starting from the rim region of the lens at the side end of the rim mounting element, said second slot is arranged to correspond to the second holding portion and serves to accommodate said second holding portion.

2. Spectacles according to claim 1, wherein the holding element is produced from a piece of wire and said second pin portion and the second holding portion are formed by correspondingly bent portions of the wire.

3. Spectacles according to claim 2, wherein the wire is a round wire.

4. Spectacles according to claim 2, wherein the wire is produced from titanium or from a material containing titanium.

5. Spectacles according to claim 2, wherein the wire is at least partially coated or enveloped or provided with different paint applications.

6. Spectacles according to claim 1, wherein the bridge element including a bent piece of wire including two first pin portions and the two first holding portions formed by correspondingly bent portions of said wire.

7. Spectacles according to claim 6, wherein the wire is a round wire.

8. Spectacles according to claim 6, wherein the wire is produced from titanium or from a material containing titanium.

9. Spectacles according to claim 6, wherein the wire is at least partially coated or enveloped or provided with different paint applications.

10. Spectacles according to claim 1, wherein the side part is connected to the holding element by a side-joint.

11. Spectacles according to claim 1, wherein the holding element constitutes a formed part to which the second pin portion and a holding portion are formed on in the shape of a web.

12. Spectacles according to claim 1, wherein each first slot and each second slot extend in a direction such that an imaginary extension of the respective slot extends beyond the associated lens or the associated rim mounting elements towards the other lens or its rim mounting element and intersects or crosses the other slot.

13. Spectacles according to claim 12, wherein said first slots and second slots extend parallel relative to one another.

14. Spectacles according to claim 1, wherein a sleeve is arranged between each pin portion and the associated through bore.

15. Spectacles according to claim 14, wherein the sleeve is secured in the associated through-bore by a press-fit or an adhesive.

16. Spectacles according to claim 14, wherein the first and second pin portion, respectively, are secured in the associated sleeve by an adhesive.

17. Spectacles according to claim 1, wherein the first and second pin portion are secured in the associated first and second through-bore by means of an adhesive.

18. Spectacles according to claim 1, wherein the first pin portion and the second pin portion are introduced from the front face of the lens or of the first and second rim mounting elements into the associated first and second through-bore.

19. Spectacles comprising:

two lenses;

a bridge element connecting the two lenses;

a holding element per lens and a side connected to the holding element;

the bridge element includes two first pin portions and a first holding portion for each first pin portion, each first pin portion arranged so as to intersect, at a distance, the associated first holding portion or an imaginary extension of the associated first holding portion;

each holding element including a second pin portion and a second holding portion, the second pin portion is arranged to intersect, at a distance, the second holding portion or an imaginary extension of the second holding portion;

each lens, at a nose end, including a first through-bore for receiving a first pin portion, a first slot starting from the rim region of the lens at the nose end, said first slot is arranged to correspond to the associated first holding portion and serves to accommodate said first holding portion, said first slot having a width larger than a thickness of said first holding portion such a connection between said first holding portion and said first slot is flexible enabling free movement between said first pin portion and said lenses when said lenses are subjected to a load on a front face of said lenses, at a side end of each lens, a second through-bore for receiving a second pin portion as well as a second slot are formed, said second slot starting from the rim region of the lens at the side end, said second slot is arranged to correspond to the second holding portion and serves to accommodate said second holding portion.

20. Spectacles comprising:

partially or fully enclosing first and second rim mounting elements for coupling with a pair of lenses;

a bridge element connecting the first rim mounting elements;

a holding element and a side connected to the holding element for each second rim mounting element;

the bridge element including two first pin portions and for each first pin portion a first holding portion, each first pin portion is arranged so as to intersect, at a distance, the associated first holding portion or an imaginary extension of the associated first holding portion, each holding element including a second pin portion and a second holding portion, the second pin portion is arranged so as to intersect, at a distance, the second holding portion or an imaginary extension of the second holding portion;

each first rim mounting element, at a nose end, including a first through-bore for receiving a first pin portion, a slot starting from the rim region of the first rim mounting element at the nose end, said slot being arranged to correspond to the associated first holding portion and said slot serves to accommodate said first holding portion, said first slot having a width larger than a thickness of said first holding portion such a connection between said first holding portion and said first slot is flexible enabling free movement between said first pin portion and said lenses when said lenses are subjected to a load on a front face of said lenses, each second rim mounting element, at a side part end, including a second through-bore for receiving a second pin portion, a second slot starting from the rim region of the second rim mounting element at the side end, said second slot receiving a second holding portion and said second slot starting from the rim region of the second rim mounting element at the side end, said second slot being arranged to correspond to the second holding portion and serving to accommodate said second holding portion.

* * * * *